H. Y. NORWOOD AND F. W. STALKER.
RECORDING APPARATUS.
APPLICATION FILED DEC. 15, 1916.

1,323,374.

Patented Dec. 2, 1919.

WITNESSES:
H. E. Stonebraker
Walter D. Payne

INVENTORS
Harry Y. Norwood
Frederick W. Stalker
BY
Church & Church
their ATTORNEYS H. Y. NORWOOD AND F. W. STALKER.
RECORDING APPARATUS.
APPLICATION FILED DEC. 15, 1916.
1,323,374.
Patented Dec. 2, 1919.
3 SHEETS—SHEET 2.
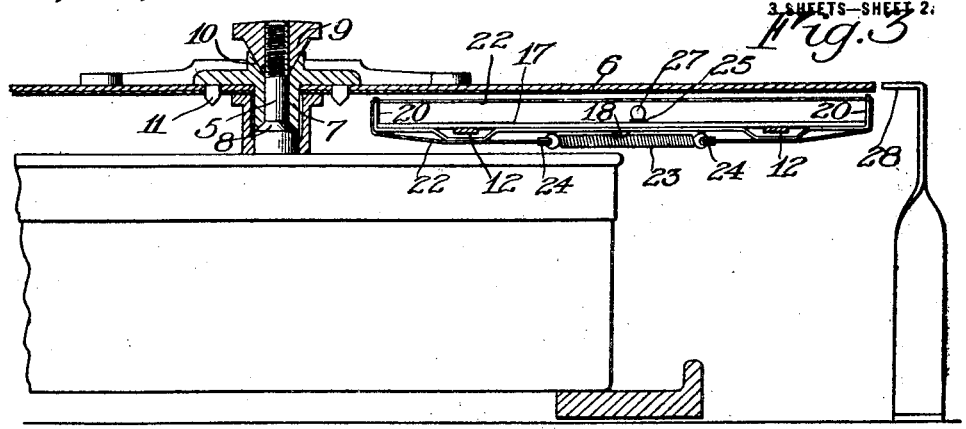
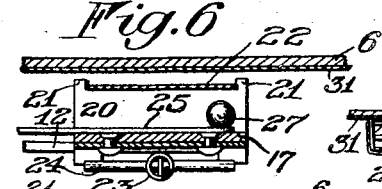
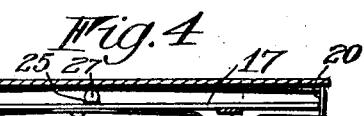
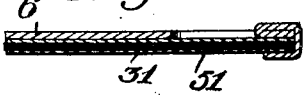
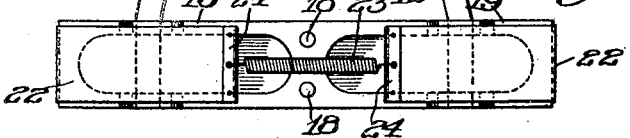
WITNESSES:
INVENTORS
Harry Y. Norwood
Frederick W. Stalker
BY
their ATTORNEYS

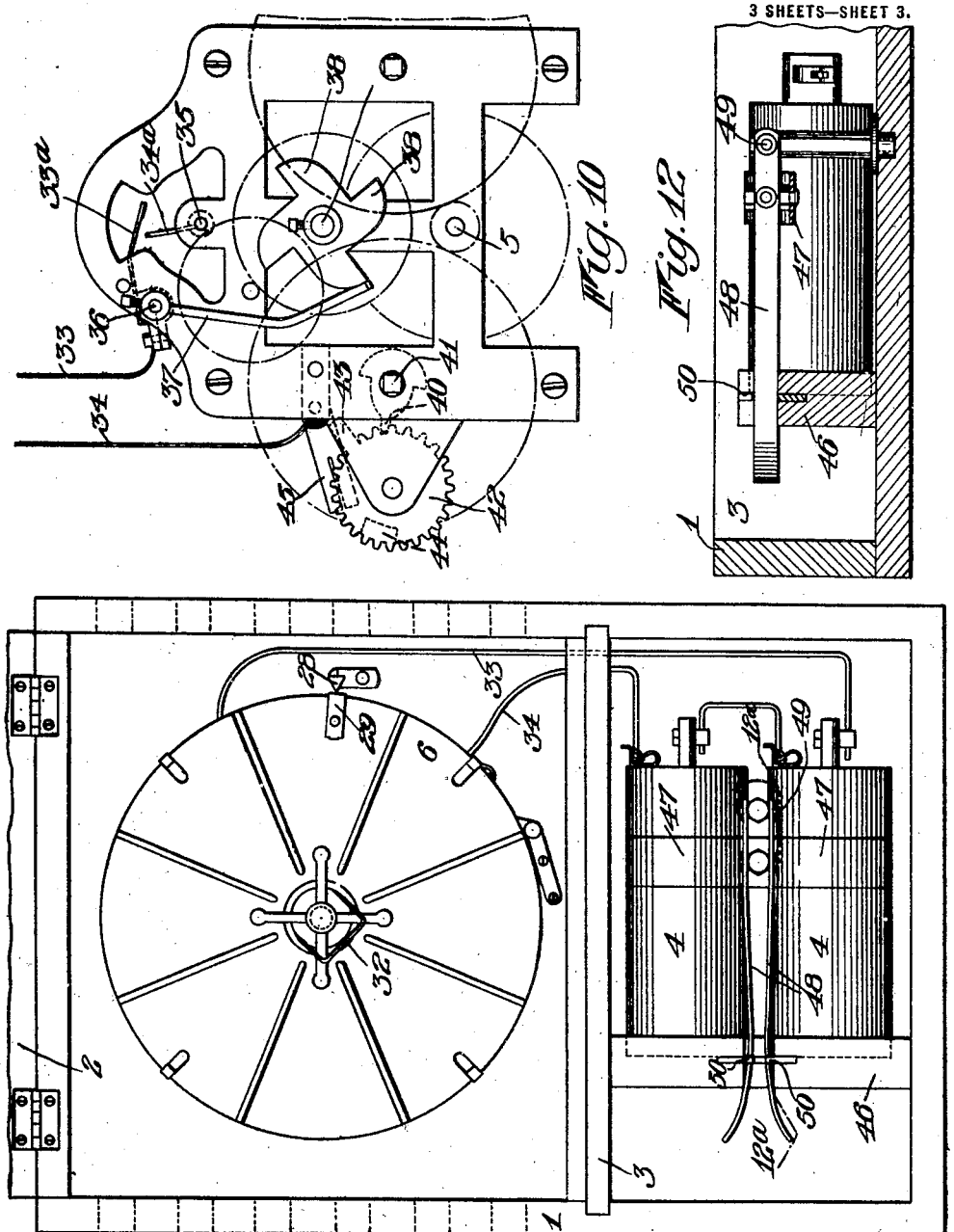

UNITED STATES PATENT OFFICE.

HARRY Y. NORWOOD AND FREDERICK W. STALKER, OF ROCHESTER, NEW YORK, ASSIGNORS TO TAYLOR INSTRUMENT COMPANIES, OF ROCHESTER, NEW YORK, A CORPORATION OF NEW YORK.

RECORDING APPARATUS.

1,323,374.  Specification of Letters Patent.  Patented Dec. 2, 1919.

Application filed December 15, 1916. Serial No. 137,087.

*To all whom it may concern:*

Be it known that we, HARRY Y. NORWOOD and FREDERICK W. STALKER, both of Rochester, in the county of Monroe and State of New York, have invented certain new and useful Improvements in Recording Apparatus; and we do hereby declare the following to be a full, clear, and exact description of the same, reference being had to the accompanying drawings, forming a part of this specification, and to the reference-numerals marked thereon.

Our invention has to do with recording apparatus and more particularly with mechanisms of the type employed in making periodical records of temperature or other conditions, as generally accomplished through the aid of a time mechanism, and the present purpose is to afford a simple structure suitable for obtaining records on flat sheets, such as disks of paper or the like. A further object of the improvement is to afford novel marking instrumentalities, that permit the use of a ribon held flatwise and out of engagement with the record sheet, with provision for always retaining the ribbon spaced from the record sheet except at the single point where a record is made. Further purposes of the invention reside in making it possible to readily position a record sheet in the machine and also in preventing damage to the machine through accidental short circuiting when the time mechanism is run down. To these and other ends the invention consists in certain improvements and combinations of parts, all as will be hereinafter more fully described, the novel features being pointed out in the claims at the end of the specification.

In the drawings:

Fig. 3 is a sectional view on the line 3ª—3ª of Fig. 1, and with the marking instrumentalities idle;

Fig. 4 is a side elevation showing the marking instrumentalities in position of making a record;

Fig. 5 is a sectional view of the same;

Fig. 6 is an enlarged sectional view on the line 6ª—6ª of Fig. 1;

Fig. 7 is an enlarged bottom plan view of the ribbon frame;

Fig. 8 is a fragmentary bottom view of the support with a record sheet thereon;

Fig. 9 is a sectional view on the line 9ª—9ª of Fig. 8;

Fig. 10 is a plan view of the clock mechanism controlling the electro-magnet circuit;

Fig. 11 is a plan view of the entire apparatus in operating relation with the cover of the casing in open position, and Fig. 12 is a sectional view on the line 12ª—12ª of Fig. 11.

Similar reference numerals in the several figures indicate the same parts.

Figure 1:
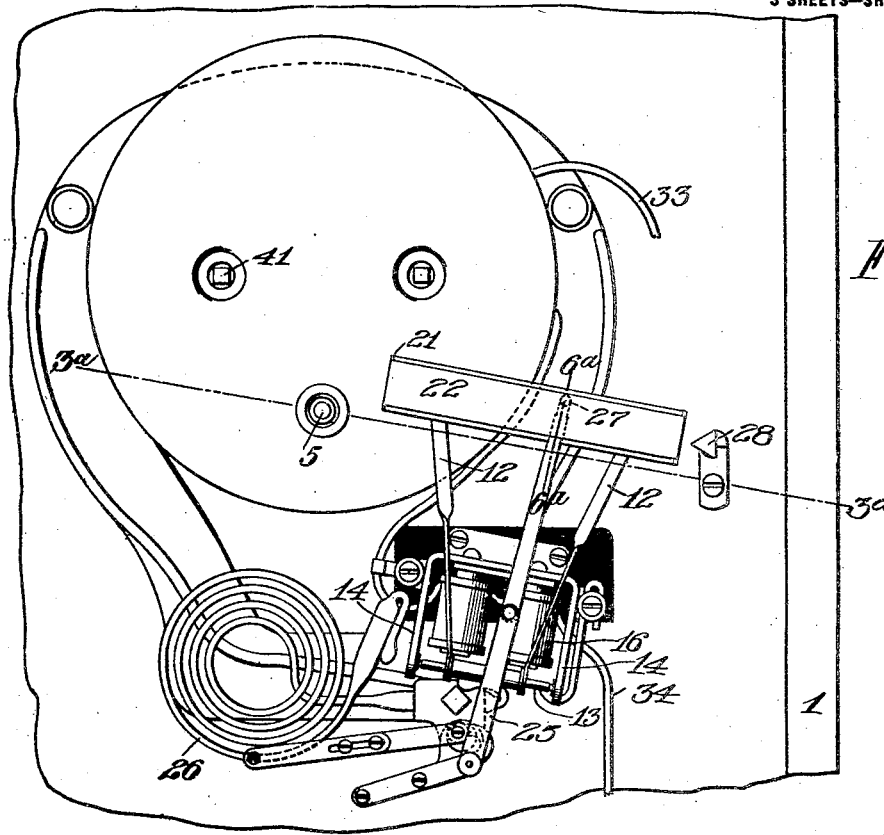
Figure 1 is a plan view of an apparatus constructed in accordance with the present invention.

In the present embodiment of the improvement, which is intended primarily as an illustration of one possible means for carrying out the invention, and in no sense as limiting the scope of the improvement to the particular mechanism set forth, 1 designates a housing or casing containing a cover 2 that is hinged, and a wall or partition 3 separating the casing into two compartments, one of which houses the cells 4 of the battery and the other of which houses the time and recording mechanisms that will now be described.

The clock mechanism which will be more fully described presently, includes a shaft or arbor 5 which constitutes the carrier upon which the record support is mounted, the latter being designated at 6. The record support comprises a disk of metal or other suitable material, and is held in place on the carrier 5 through the instrumentality of a sleeve 7 engaging a beveled shoulder 8, and a wedge nut 9 that engages a beveled shoulder 10 on the sleeve 7, as shown in Fig. 3. 11 designates sharpened points or projections on the support which serve to hold the record sheet or disk of paper or other suitable material in place, and it will be observed that when the parts are in operating relation the record sheet is inverted, that is to say, is located on the under side of the support, the recording instrumentalities being also on the under side of the support and operating upwardly to effect a record, as will appear more fully hereinafter.

Figure 2:
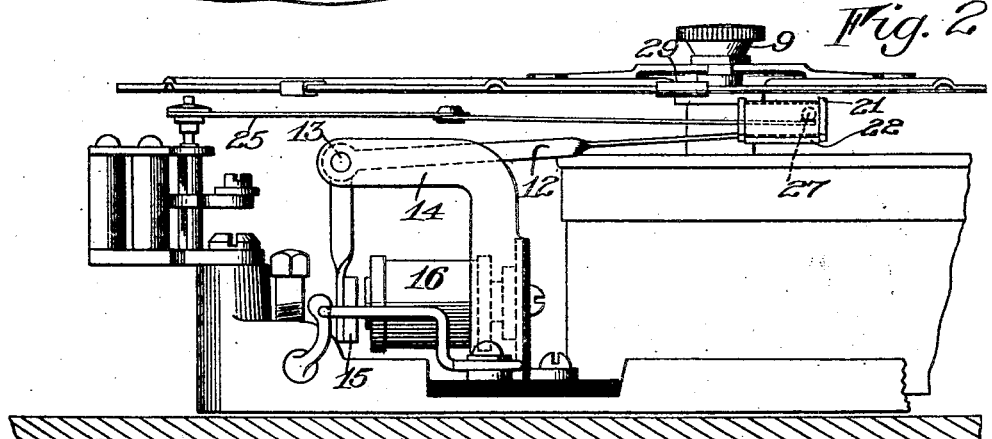
Fig. 2 is a side elevation of the same.

The recording mechanism comprises an actuator having a pair of spaced arms 12 fixed on a spindle 13 pivotally mounted in bearings carried by the spring standards 14. A dependent arm (Fig. 2) fixed to spindle 13 carries an armature 15 which coöperates with the electromagnet 16, and actuator arms 12 are provided at their ends with an operating rod or bar 17 which engages the impression member to effect marking on the record sheet. The actuator also carries a ribbon frame, and to this end, the bar 17 has secured thereto by means of rivets 18 a frame designated generally at 19, which is formed of spring metal or the like to permit relative movement between the end portions of the ribbon frame and the actuator, as shown in Fig. 4. The ends of the ribbon frame are designated by 20, as shown in Fig. 5, and provided at their edges with feet or projections 21, affording therebetween a recess for the ribbon 22, which is preferably of any suitable inked material. When the ribbon frame is forced toward the record sheet, the latter is engaged by the feet or projections 21, while the ribbon 22 is sufficiently spaced from the record sheet to prevent its coming in contact therewith except at a single point where the impression is made. In other words, the ribbon is prevented from smudging or blurring the record by being held away from the sheet through the projections 21, as shown clearly in Figs. 4 and 5. The ribbon 22 is held upon the ribbon frame in the manner shown in Figs. 4 and 6, preferably by means of a spring 23 connecting plates 24 which are attached to the ends of the ribbon. The ribbon frame is attached to the bar 17 at its central portion only, as designated by the securing rivets 18 already referred to, and as a result of this, when the ribbon frame is brought into engagement with the record sheet on its support, further movement of the actuator bar 17 is permitted by a relative movement between it and the ribbon frame, whereby the bar 17 is moved far enough to force the impression member, now to be described, against the ribbon, and move the latter against the record sheet at the point of record, as shown in Fig. 4.

The impression member is designated generally at 25, being pivotally mounted for swinging movement about a vertical axis, and controlled in such swinging movement by any suitable means, such for instance as a temperature controlled expansion and contraction coil 26 to which it is connected as shown in Fig. 1. By this means, the impression member 25 is caused to have a lateral movement, or a movement longitudinally of the ribbon frame, depending upon the variations of temperature or other condition to be recorded, and the width of the inked ribbon is sufficient to permit of making a record at any point in the arc of movement of the impression member. The latter carries at its outer end an operating portion preferably in the form of a small metallic ball 27, which, when the impression member is engaged by the actuator, moves upwardly against the ribbon, as shown in Fig. 4 and causes the latter to make a small mark upon the record sheet, the position of such mark being determined, as already indicated, by the position of the impression member or arm 25, which varies, in the present instance, with the temperature. 28 designates a stationary indicator located in the arc of travel of the operating portion 27 of the impression member, and coöperating with an indicator 29 upon the upper side of the support 6, already referred to, and as shown in Fig. 11. The indicator 29 is located on the support 6 in a position corresponding to an indicator 30 on the reverse side of the support, and which coöperates with the paper record sheet or disk 31.

The object of this construction is to insure repositioning the record sheet at the proper point after its removal from the apparatus for any purpose. To illustrate this, if the record sheet has been removed when it is repositioned in the machine, it is set upon its support so that the indicator 30 points to the proper time when it is repositioned. The record sheet support is inverted when placed in the machine so that it is not visible from the upper side, but by positioning the support so that the indicator 29, see Fig. 11, corresponds or coincides with the indicator 28, the parts will be in proper position for commencing the operation. 32 designates a pivoted bail or handle on the support 6, for readily removing or positioning the latter.

The electromagnet 16 already referred to is energized at predetermined intervals for operating the actuator, through a clock mechanism which periodically opens and closes the electric circuit that includes conductors 33 and 34 leading from the battery already mentioned to the electromagnet 16 through a switch 33ª. The latter closes preferably every fifteen minutes by being moved toward a switch member or circuit closer 34ª mounted upon the minute arbor of the clock mechanism. The switch 33ª is pivoted at 36 and carries an arm 37 which lies in the path of a four-lobed cam wheel 38 mounted upon the hour arbor or spindle of the clock mechanism. The four lobes 38 permit the switch 33ª to rock about its axis every fifteen minutes and at this interval to be in such condition as to be engaged by the switch 34ª on the minute arbor, which rotates once every minute. When contact is made between the terminals 33 and 34 every fifteen minutes or at any other interval that may be selected by changing the cam wheel on the hour arbor 39, the electromagnet 16 is energized and a record is made on the record sheet, showing the position of the impression member or temperature controlled arm at the particular moment when the circuit is closed. It is desirable that means be provided to prevent the electromagnet circuit from remaining closed when the clock mechanism is run down, and to this end means are employed for automatically opening the circuit when the operation of the clock mechanism is stopped from exhaustion of the spring. This is preferably accomplished by mounting a single tooth 40 upon the winding arbor 41 and arranging a pinion 42 to engage said tooth. The pinion 42 carries a blind tooth or projection 43 which acts to prevent overwinding the arbor 41. The wheel 42 carries an insulated portion 44 and 45 is a wiper which engages the wheel 42 to normally close the circuit. When the winding arbor reaches its unwound position, the insulated portion 44 on the pinion 42 will have come into contact with the wiper 45, thus causing the electromagnet circuit to be opened and remain open until the spring of the clock mechanism is rewound. The pinion 42 is so related to the tooth 40 that it is moved through the distance of two teeth for every revolution of the winding arbor 41, although this particular structure may be varied in different ways without changing the ultimate result of opening the main controlling circuit when the clock mechanism spring is unwound.

The mechanism herein disclosed is used to considerable extent upon refrigerator cars, as a consequence of which it is desirable to provide means for holding the cells 4 of the battery in rigid relation in the casing, and preventing their vibration. With this in view we employ a block 46 that is recessed to receive the ends of the cells, while 47 designates a yoke that engages the side of the cells 4, as shown in Fig. 11. The yoke 47 is carried by a pair of spring arms 48 which are pivotally mounted at 49, and when swung downwardly, engage under shoulders or latches 50 and serve to hold the cells rigidly in position. By springing the free ends of the arms 48 toward each other they are released from the shoulders 50, and the yoke 47 can then be swung upwardly about the pivot 49 to permit removal of the cells.

In order to secure a plurality of records, two or more record sheets may be employed with a carbon sheet 51 between them, as shown in Fig. 9, and by utilizing a flat support and flat record sheet, it is possible to secure several duplications of the record, as accurately as the original, owing to the arrangement of the flat ribbon and coöperating impression member.

We claim as our invention:

1. In a time controlled recording apparatus, the combination with a movable flat support for a record sheet, of a marking ribbon supported in spaced relation to the support, an impression member movable to different positions over the ribbon in accordance with variations in the condition to be recorded, and an actuator upon which the ribbon is carried, the actuator being movable independently of the ribbon and operating intermittently to move the impression member against the ribbon to cause the latter to engage and mark a record sheet on the support.

2. In a recording apparatus, the combination with a movable support for a record sheet, an impression ribbon, an actuator in which said ribbon is supported in spaced relation with said record sheet, an impression member movable to different positions over said ribbon independently of the actuator, and means for operating the actuator to move the impression member and with it the ribbon into contact with the record sheet.

3. In a time controlled recording apparatus, the combination with a movable flat support for a record sheet, of a marking ribbon and a ribbon frame on which the ribbon is mounted, spacing means on the ribbon frame coöperating with the surface of the record sheet to maintain the ribbon spaced from the record sheet, an impression member movable to different positions over the ribbon in accordance with variations in the condition to be recorded, and an actuator upon which the ribbon frame is carried, the actuator being movable independently of the ribbon frame and operating intermittently to move the impression member against the ribbon to cause the latter to engage and mark a record sheet on the support.

4. In a recording apparatus, the combination with a movable support for a record sheet, an impression ribbon, an actuator in which said ribbon is supported in spaced relation with said record sheet, an impression member movable to different positions over said ribbon independently of the actuator, condition controlled means for selectively positioning said impression member, and means for operating the actuator to move the impression member and with it the ribbon into contact with the record sheet.

5. In a recording apparatus, the combination with a movable support for a record sheet, an impression ribbon, an actuator in which said ribbon is supported in spaced relation with said record sheet, an impression member movable to different positions over said ribbon independently of the actuator, means for selectively positioning said impression member, and time controlled means for moving the impression member and with it the ribbon into contact with the sheet.

6. In a recording apparatus, the combination with a movable support for a record sheet, an impression member, means for selectively positioning said impression member with reference to the record sheet, an actuator for moving the impression member into contact with the record sheet, and means on the actuator for carrying a ribbon interposed between the impression member and the sheet.

7. In a recording apparatus, the combination with a movable support for a record sheet, an impression member, an actuator for moving the impression member into contact with the record sheet, means on the actuator for carrying a ribbon interposed between the impression member and the sheet, and time controlled means for moving the actuator to make an impression on the sheet.

HARRY Y. NORWOOD,
FREDERICK W. STALKER.